United States Patent [19]

Lin

[11] Patent Number: 5,717,957
[45] Date of Patent: Feb. 10, 1998

[54] MULTIPLEXOR FOR INTERFACING SCANNER AND PRINTER WITH A FUNCTION SELECT CIRCUIT INCLUDING THREE MULTIPLEX, TRI-STATE BUFFERS, AND BUFFER CIRCUITS AND DISPLAY DEVICE FOR STATUS INDICATION

[75] Inventor: Joseph Lin, Taipei, Taiwan

[73] Assignee: Behavior Tech Computer Corporation, Taipei, Taiwan

[21] Appl. No.: 500,170

[22] Filed: Jul. 10, 1995

[51] Int. Cl.[6] .................................................. G06F 13/00
[52] U.S. Cl. ................................................ 395/892; 395/836
[58] Field of Search ........................... 364/238.2, 260.1; 395/828, 831, 834, 858, 882, 892

[56] References Cited

U.S. PATENT DOCUMENTS

| | | | |
|---|---|---|---|
| 4,593,390 | 6/1986 | Hildebrand et al. | 370/541 |
| 4,631,698 | 12/1986 | Walsh et al. | 395/285 |
| 4,789,984 | 12/1988 | Swartz | 370/541 |
| 4,866,667 | 9/1989 | Shimada | 395/311 |
| 5,133,055 | 7/1992 | Liberman et al. | 395/275 |
| 5,204,859 | 4/1993 | Paelser et al. | 370/105.1 |
| 5,247,623 | 9/1993 | Sun | 395/325 |
| 5,276,443 | 1/1994 | Gates et al. | 340/825.06 |
| 5,422,580 | 6/1995 | Mandel et al. | 326/30 |
| 5,425,135 | 6/1995 | Motoyama et al. | 395/114 |
| 5,457,784 | 10/1995 | Wells et al. | 395/829 |
| 5,513,302 | 4/1996 | Tsai | 395/114 |

Primary Examiner—Thomas C. Lee
Assistant Examiner—Anderson I. Chen
Attorney, Agent, or Firm—Morton J. Rosenberg; David I. Klein; Jun Y. Lee

[57] ABSTRACT

The present invention relates to a switch for computer peripheral devices, which is connected between the printer port of personal computer and a printer or a scanner. That is to say the personal computer transmits instruction signals to the switch for computer peripheral devices through the printer port according to the requirement of usage and signal linkage of the peripheral devices such as a printer and a scanner. The switch of the computer peripheral devices order the printer port to connect and communicate with the printer, scanner and other computer peripheral devices for the data input and output transmission, so that when the printer and the scanner are in operation, the computer form a information linkage and transmission structure according to the control of the instruction signal.

1 Claim, 4 Drawing Sheets

MULTIPLEXOR FOR INTERFACING SCANNER AND PRINTER WITH A FUNCTION SELECT CIRCUIT INCLUDING THREE MULTIPLEX, TRI-STATE BUFFERS, AND BUFFER CIRCUITS AND DISPLAY DEVICE FOR STATUS INDICATION

FIELD OF THE INVENTION

The present invention relates to a new structure of the switch for the computer peripheral devices, especially, to a switch device used in the computer peripheral device, and a switch structure in which the instruction signals are used to the switching control of the computer peripheral devices.

BACKGROUND OF THE INVENTION

Description of the Prior Art

Nowadays, the computer is the most popular device used in the data I/O and information administration, which is also helpful in the affairs of the industry and business, so the develop about the industry and technology of the computer particularly the personal computer (PC) is improved rapidly. This is because the personal computer is widely used in the information I/O and administration of the daily life, so the demand quantity, data transmission, the data processing speed and other properties are important to the consumers.

However, other than central processing unit (CPU) the most important peripheral control equipment is the computer peripheral interface circuit for determining the performing of the instruction, the data transmission, the data processing speed and other properties. For example: the monitor, joystick, printer, scanner, CD-ROM and other peripheral devices is required to be controlled by the computer peripheral interface circuit, so that the computer peripheral devices is administrated and connected by the mainframe of personal computer for performing proper I/O operation.

But there are many problems for the operation, controlling and driving of the peripheral devices, for example: in the generally used I/O card for the computer peripheral device, when the printer is in use, the printer ports (ex. LPT1 and LPT2) are usually singly, and it can not provide to other computer peripheral devices such as scanners. If we want to use other peripheral devices such as scanner, other interface circuits of the computer peripheral devices (generally be called by interface card) suitable for the scanner must be installed, it is waste in cost and time consuming for assembling the mainframe of the computer, and the interface circuit of the computer peripheral device occupies the space thereof, so when we want to expand the peripheral devices, the interface ports is not enough. This will decrease the efficiency of the printer, and the expansion of the personal computer is confined.

Furthermore, the other question about the computer peripheral devices is the property of single selection, for example: when the printer is used in normal condition, only the printer can be used singly, and other peripheral device such as scanner can not be used simultaneously. We must cut off the printer and switch to the scanner for scanning graphs. This will cause the user must interrupt one device for switching to other device repeatedly, but it is time waste. Particularly in the case of two computer peripheral devices used alternatively, for example: the printer prints the graphs scanned by the scanner, wherein after the graphs is scanned completely the printer print the graphs. So that the operation procedure for the switching of the computer peripheral device is complicated and is difficult to perform, and the probability of mistake is also increased, thus it is a disturbance for the user of the PC to operating the computer peripheral devices.

SUMMARY OF THE INVENTION

Accordingly, the main object of the present invention is to provide a new structure of switch for computer peripheral devices, particularly the switch is comprised of at least three standard BD-25 connectors, in which the first connector is connected to the printer port of said personal computer so to connect the I/O card of the mainframe of the computer, it provides a related control linkage between the mainframe of the computer and the input/output information of the switch or related control signals; and the pins of other two connectors is defined and is arranged according to the signal control and required properties of the data input and output when the printer and the scanner are in use, and according to the usage of the printer and the scanner and the operating requirement, the user gives the control instructions signal for using the primer and the scanner directly to the switch through the personal computer, so to connect the the connector of the printer or the scanner with the I/O port of the printer ports, thus when the printer and the scanner are used, it can perform quick I/O or connection action with the mainframe of the computer, i.e., a plurality of computer peripheral devices are used simultaneously and rapidly by the switch instruction, so we can use a peripheral device without cut off other peripheral device used previously, thus a plurality of peripheral device can be used almost synchronously and be switched automatically and multiplexly, therefore by using the present invention a single peripheral interface circuit is connected with a plurality of computer peripheral devices.

For a complete understanding of the present invention and for further objects and advantages thereof, references can now be had to the following description, taken into conjection with accompanying drawings in which.

DESCRIPTION OF THE PREFERRED EMBODIMENTS

Figure 1:
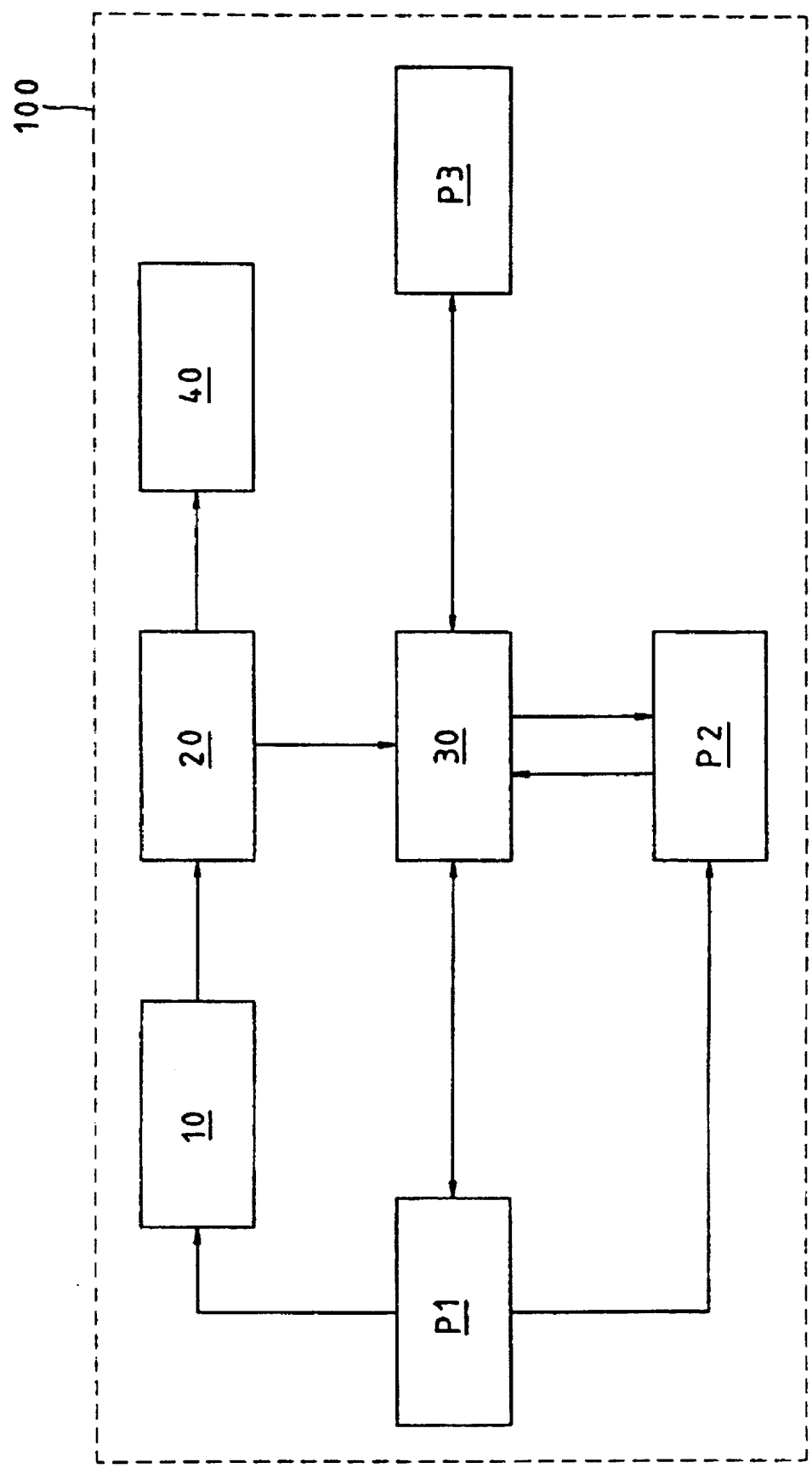
FIG. 1 is the block diagram of the system circuit of the present invention.

The FIG. 1 shows the switch of the present invention 100 which is comprised of a decoder circuit 10, a function selection circuit 20, a control circuit for multiplex switching 30, a display device 40, a connector of the printer port P1, a connector of the printer P2 and a connector of the scanner P3, in which the connector of the printer port P1, the connector of the printer P2 and the connector of the scanner P3 are formed by standard DB-25 connector, and the connector of the printer port P1 is connected to the LPT1 or LPT2 of the I/O card within the personal computer, in order to transfer the control instruction signal for switching from PC to the decoder circuit 10, or the printing information from the personal computer is transferred to the peripheral devices of printer connected to the connector of the printer P2, and form a linkage of information channel (i.e. including input/output) with the control circuit for multiple switching 30.

Moreover the decoder circuit 10 receives control instructions for switching input from the connector of printer port P1, the instructions can be set by software (which will not be description in this application) and be changed to a form of control signal for output, the decoder circuit 10 identifies the input control instruction signal, if it is matched with the preset control instruction, the decoder circuit 10 transmits a proper control instruction to the function selection circuit 20, which transmit proper display signal and driving signal selected according to the received control signal to the display device 40 and the control circuit of multiplex switching respectively, so it is provided to the status display of the switch and the performing of the switch action. Finally, the connector of the printer port P1, the connector of the printer P2 and the connector of the scanner P3 are formed as a linkage structure according to the driving signal transmitted from the function selection circuit 20 by the control circuit for multiplex switching 30, so that when the printer or the scanner is in use, they form a data linkage and operating control instruction with the mainframe of the personal computer in the proper time (under switching), thus the object that the printer port of the mainframe of the personal computer is connected to a plurality of peripheral devices is attained, therefore the circuit structure of the integral system of the switch for the computer peripheral devices 100 is constructed.

Figure 2:
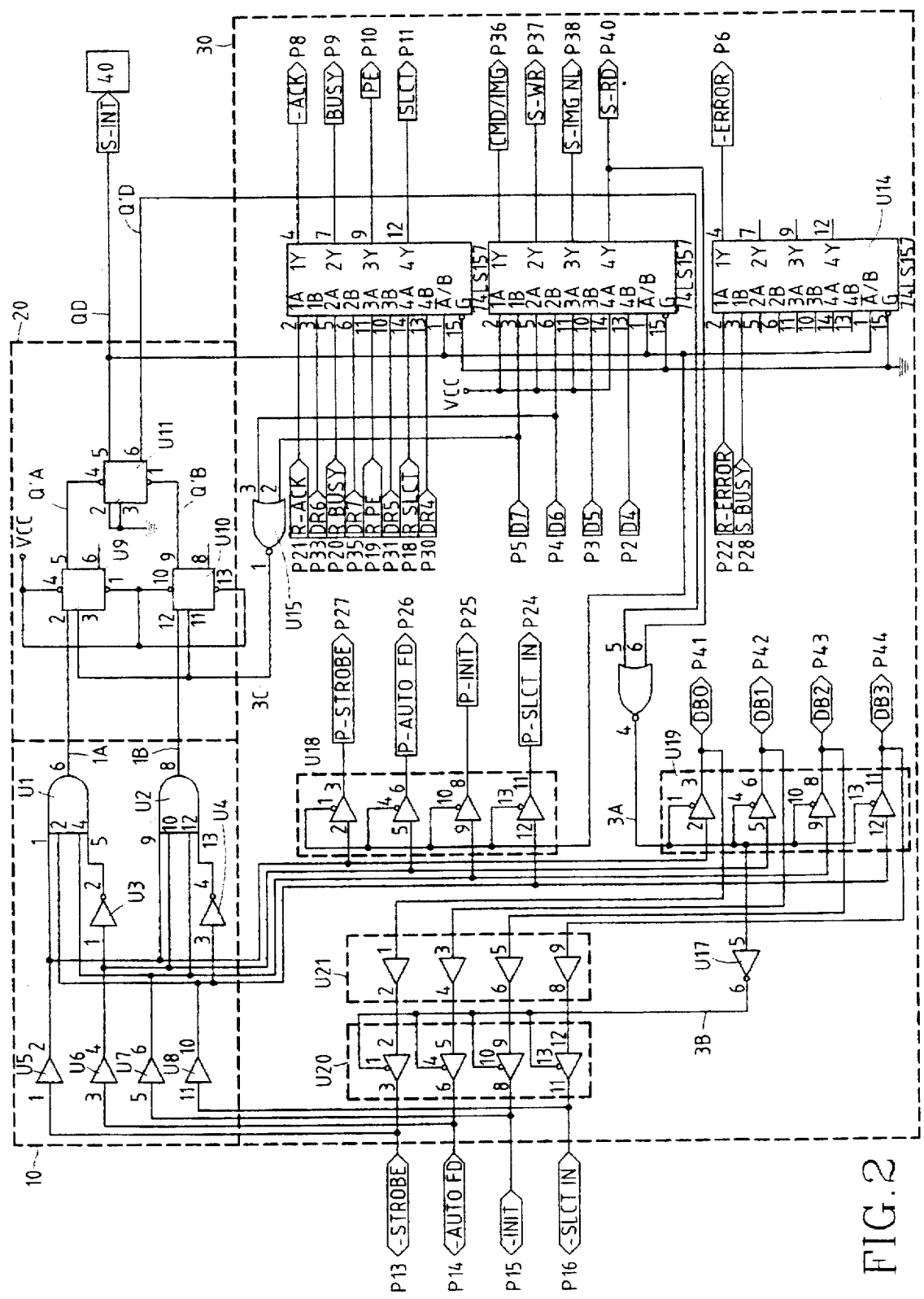
FIG. 2 is the detailed circuit diagram of the present invention.

FIG. 2 shows the detailed structure of the switch for computer peripheral devices of the present invention in the FIG. 1, the decoder circuit 10 is comprised of at least two AND gate circuits U1 and U2, inverts U3 and U4 and at least four buffers U5–U8. The AND gate circuit U1 and inverted U3, AND gate circuit U3 and inverted U4 form two decoder circuits respectively, and control instructions of signal form are transmitted from the connector of the printer port P1 through the buffers U5–U8. After decoding, proper control signals are form the output 1A of the AND gate U1 and the output 1B of the AND gate U2 and are transferred to the function selection circuit 20.

The function selection circuit 20 is comprised of a least three D type latching circuits U9–U11, in which the input of the D type latching circuits U9 and U10 are connected to the inputs 1A and 1B of the decoder circuit 10 respectively, so that it can received the control signal from the decoder circuit 10. The outputs Q'A and Q'B of the D type latching circuit U9 and U10 are connected to the PRESET and CLEAR of the D type latching circuit U11 respectively, thus it can control the output condition of QD in the D type latching circuit, so that the output signal is provided to the display device 40 and the control circuit for multiplex switching 30, that is to say, the final output condition of the output QD in the function selection circuit 20 is determined by the outputs 1A and 1B of the decoder 10. For example: when the voltages of the output 1A and 1B are low, the output will not transfer any control signal for switching and sustain the original switching condition; when the voltage of the output 1A is low, and the voltage of the output 1B is high, then the voltage of QD is low; otherwise when the voltage of the output 1A is high, and the voltage of output 1B is low, then the voltage of QD is high.

Moreover, the control circuit for multiplex switching 30 is comprised of at least three multiplex circuits U12–U14, two NOR gate circuits U15 and U16, a inverter U17, at least three tri-state buffer circuit U18, U19 and U20 and a buffer set U21, in which the output QD of said function selection circuit 20 is connected directly to the control ends A'/B for multiplex switching for controlling the multiplex circuit U12–U14 and the control end of the tri-state circuit U18, so that the signal pins of A and B channels on the multiplex circuits U12–U14 can be controlled and switched and trans- fer signals through the linkage of the outputs 1Y–4Y (the input pins of the A channel are the corresponding input pins of the printer, and the input pins of the B channel are the corresponding input pins of the scanner), i.e., A and B channels of the multiplex circuits U12–U14 are connected to the corresponding pins in the connector of the printer port P1 respectively, and the output 1Y–4Y are connected to the corresponding pins in the connector of the primer P2 and the connector of the scanner P3 respectively. The NOR gate circuit U16 and the inverter U17 is controlled by the inverted output end QD' of the function selection circuit 20. The outputs of tri-state buffer circuit U19 and U20 are controlled by the outputs 3A and 3B thereof respectively, and the working clock (or the clock for switching) of the D type latching circuits U9 and U10 in the function selection circuit 20 is provided by the output 3C of the NOR gate circuit U15, in order that the function selection circuit 20 can detect the new output condition from the output 1A and 1B of the decoder circuit 10 at all times, so it can change the control signal for switching of the output end QD and the inverted output end QD' in the function selection circuit 20. Moreover, the outputs of the tri-state buffer circuits U18, U19 and U20 are connected to the connector of the printer port P1, the connector of the printer P2 and the connector of the scanner P3 respectively through the buffer U5–U8 and the buffer set U21, and form an information linkage type of the input data or the output data, thus the object of multiplex switching is attained. The purpose of using three tri-state buffer circuits U18–U20 in the present invention is to separate effectively the signal linkage structure of the input data from that oft he output data. Therefore the detailed circuit structure of the integral system of the switch for the computer peripheral devices 100 is constructed.

Figure 3:
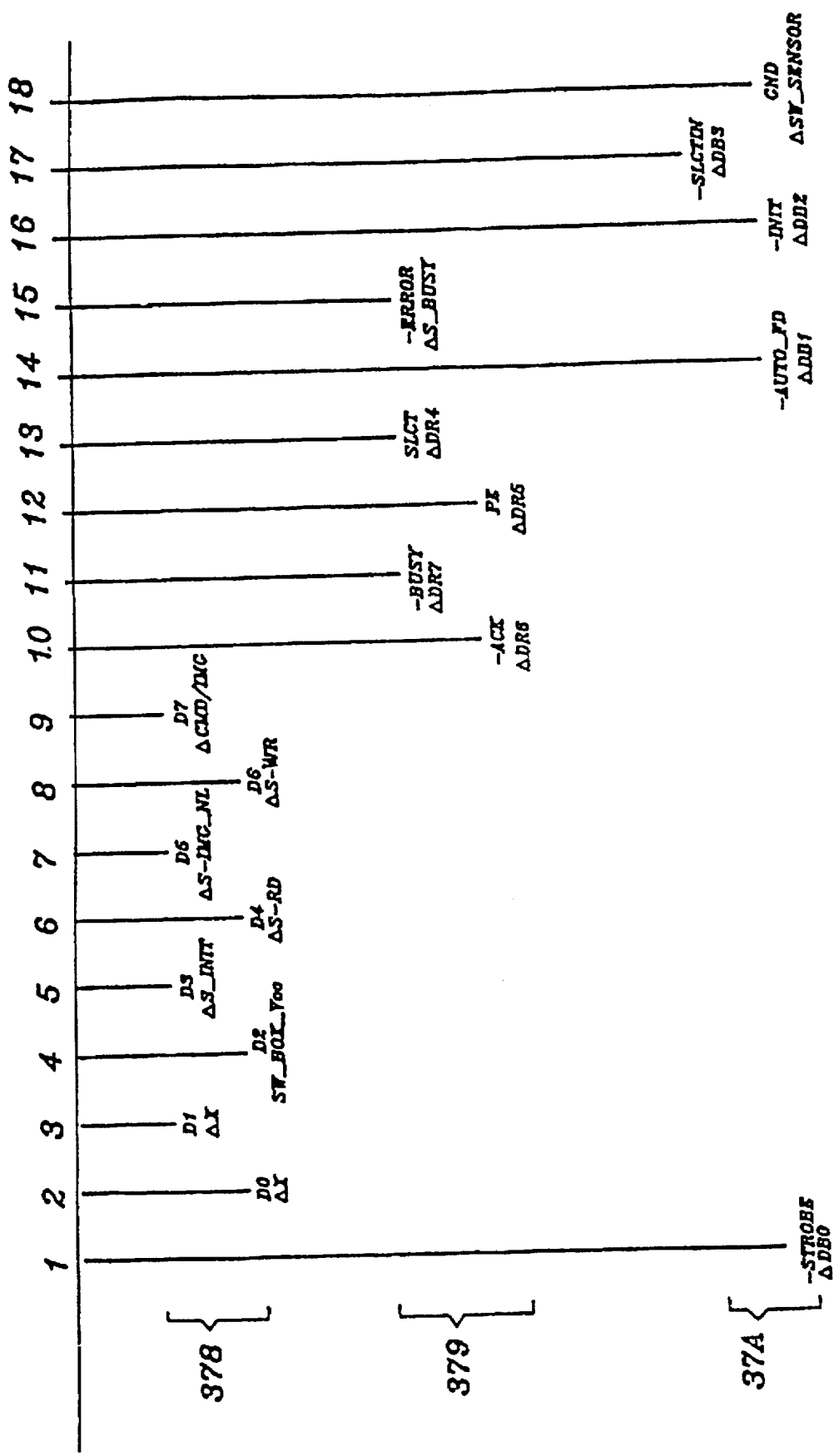
FIG. 3 shows the definition of pins about the connector of the printer and the connector of the scanner.

FIG. 3 shows the definition of pins about the connector of the printer and the connector of the scanner, which is also the definition of pins of the input and output structure shown in the FIG. 2, in which, because the connector of the printer P2 and the connector of the scanner P3 are standard DB-25 connector, so the 19th and 25th pins of the two connectors are grounded. The triangle marked in the FIG. 3 is the definition of the pin in the connector of the scanner P3, and the 2nd and 3rd pins are in the state of N. O. (normal open). The data port 378, status port 379 and control port 37A express the corresponding I/O data storage of the I/O card and control address of the personal computer respectively.

For a complete understanding of definition of the pins in the connector of the printer P2 and the connector of the scanner P3 and for further identifying the data port 378, the status port 379, and the control port 37A, references can now be had to the following description, in which:

1. the definition of the pins in the connector of the printer P2:

a. data port 378:

| D0–D7 | single way data bus |
| --- | --- | b. status port 379

| ACK | agreement signal (allow the interface to transmit again) |
| --- | --- |
| BUSY | busy on line |
| PE | lack of paper |
| SLCT | has been selected |
| ERROR | error message | c. control port 37A

| | |
|---|---|
| STROBE | trigger signal for the peripheral devices to receive signal |
| AUTO_FD | auto feed |
| INIT | initial signal |
| SLCT_IN | select this peripheral device |

2. when the connector of the printer P2 and the connector of the scanner P3 is communicated for information, the definition of the pins in the connector of the scanner P3 is as following:

a. data port 378

| | |
|---|---|
| CMD/IMG | scanner instruction/image |
| S-WR | order for scanner to write |
| S-IMG_NL | order for scanner to skip line |
| S-RD | order for scanner to read image |
| S-INIT | function display of the action of the scanner |
| SW_BOX_VCC | power supply of the switch for the computer peripheral devices 100 | b. status port 379

| | |
|---|---|
| S_BUSY | scanner in busy condition |
| DR4–DR7 | data bus for one way data transmission | c. control port 37A

| | |
|---|---|
| DB0–DB3 | data bus for two way data transmission SW_SENSOR sensor end of the switch for the computer peripheral devices 100 |

Figure 4:
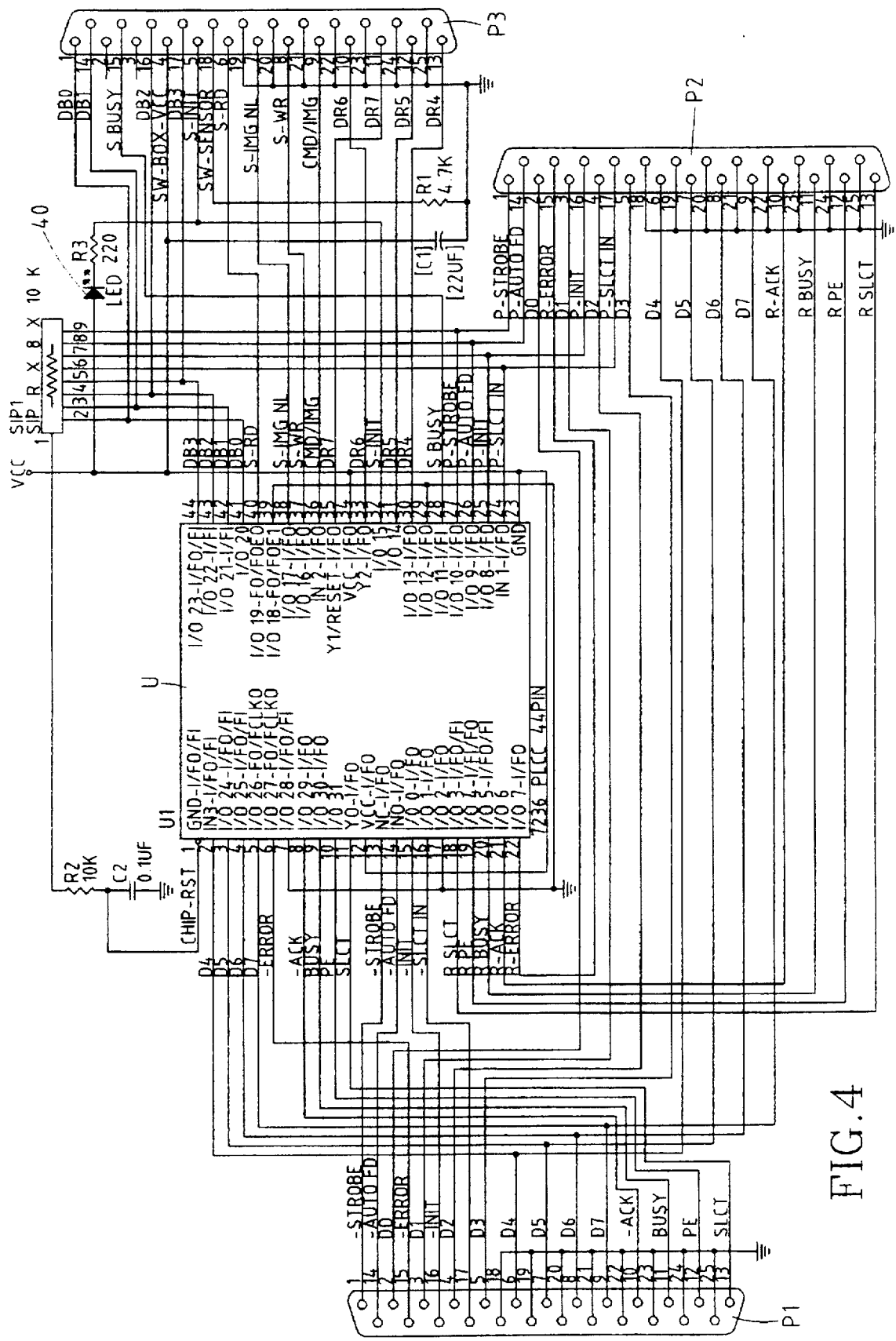
FIG. 4 is the preferred embodiment of the present invention.

FIG. 4 shows the preferred embodiment of the integral structure of the switch for the peripheral devices 100 in the FIGS. 1, 2, and 3, wherein the circuits of decoder circuit 10, function selection circuit 20 and the control circuit for multiplex switching are integrated as an integrated circuit of U type, and the display device 40, the connector of the printer port P1, the connector of the printer P2 and the connector of the scanner P3 are formed outside the integrated circuit, so the volume and the cost of the circuit are simplified. When we start the mainframe of the personal computer, the original state can be set at the condition of the connector of printer port P1 communicated with the connector of the printer P2, and the connector of scanner P3 not communicated with the connector of the printer port P1, i.e., the state of the printer being in use. Then if the voltage in the output QED of function selection circuit 20 is low, this will light the display device 40 and the printer is on line; then according to the user requirement of the peripheral devices the user can give instructions for switching the peripheral devices through the mainframe of PC, so that the switch for computer peripheral devices 100 of the present invention switch off the printer and switch on the scanner according to the switch action described in the FIGS. 1 and 2, and now the display device 40 is extinguished, so the switch for computer peripheral devices is in the state of the scanner being on line, thus the state of the computer peripheral devices is rapidly and repeatedly switched. So the in the present invention the object of switching computer peripheral devices such as printers, scanners, etc., by instructions controlled by the computer is reached.

The advantages and the effects of the switch for computer peripheral devices 100 of the present invention aforementioned above will be described hereinafter:

1. The operation is simply and convenient, and the switching of the peripheral devices is rapidly:

The switch for computer peripheral devices 100 is connected between the I/O card of the computer mainframe and the printer or the scanner, and the switching instructions are transmitted from the I/O card of the computer mainframe, so the operation by mechanically switching is unnecessary.

2. Easy to install, and more economic in space, volume and interface board of the computer:

The switch for computer peripheral devices is installed outside the mainframe of the computer, and the computer is not detached for installation. The volume of the circuit is compact so it dose not occupy the space and volume. The most important property is that said switch is used directly by connecting with the mainframe of the computer, and a plurality of computer peripheral devices is used simultaneously, so the interface board in the computer mainframe is saved effectively.

3. The operation of switching is accurate, so the input data and output data will not interrupt each other:

The D type latching elements and trio-state buffer elements are used for separation of the output of the switching control signal from the I/O data, so the operation of switch is uniquely accurate, and the mistake of action and interruption of data will not be produced. Therefore, the efficiency and accuracy of the switch for computer peripheral devices are promoted effectively.

4. by automatic and rapid multiplex switching the operation efficiency of the peripheral devices have been promoted:

The switch for computer peripheral devices in the present invention can match with a plurality of peripheral devices used alternatively. For example: the printer prints graphs after the scanner has scanned the graphs. In the present invention it is only needed to set the control instructions by software, then the printer and the scanner can be switched quickly and be operated almost synchronously, so it has avoided the need for leaving one peripheral devices as in the conventional technology.

Having described preferred embodiments of a new and improved design for the marking device in accordance with the present invention, it is believed that other modifications, variations and changes will be suggested to persons skilled in the art in view of the teachings set forth herein. It is therefore to be understood that all such variations, modifications and changes are believed to fall within the scope of the present invention as defined by the appended claims.

I claim:

1. A multiplexor for interfacing a scanner and a printer to a printer port of a personal computer, comprising:

a first connector for coupling to the printer port of the personal computer;

a second connector for coupling to the printer;

a third connector for coupling the scanner;

a control circuit coupled to said first, second and third connectors for multiplexing signals between said first connector and each of said second and third connectors responsive to a driving signal, thereby providing bi-directional communications between (a) the printer port and the printer, and (b) the printer port and the scanner to simultaneously operate the printer and the scanner;

a function selection circuit having a first output coupled to said control circuit for providing said driving signal responsive to a control signal, said function selection circuit having a second output for output of a display signal, said control circuit including (a) three multiplex circuits, (b) a plurality of tri-state buffer circuits, and (c) a plurality of buffer circuits coupled to inputs of a portion of said plurality of said tri-state buffer circuits, each of said three multiplex circuits and each of said plurality of tri-state buffer circuits having a respective control input coupled to said first output of said function selection circuit for switching communication between said first connector and one of said second connector or said third connector;

an instruction decoding circuit having an output coupled to an input of said function selection circuit and an input coupled to said first connector for providing said control signal responsive to receipt of a predetermined input control instruction signal output from the printer port of the personal computer; and, a display device having an input coupled to said second for output of said function selection circuit for providing a status indication responsive to said display signal.

* * * * *